Figure 1:
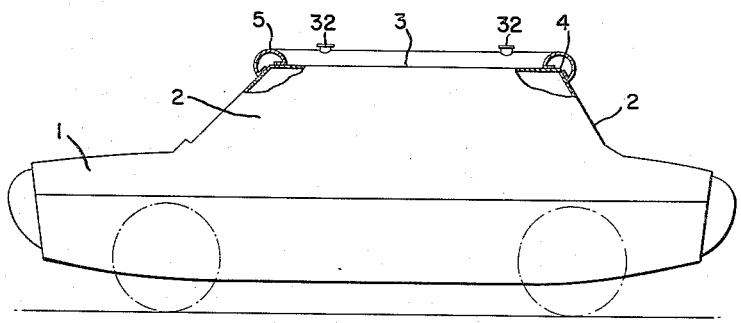

July 4, 1961  B. BARÉNYI  2,991,121
MOTOR VEHICLE ROOF CONSTRUCTION
Filed Jan. 28, 1958

INVENTOR
BÉLA BARÉNYI
BY Dicke and Craig
ATTORNEYS

United States Patent Office 2,991,121
Patented July 4, 1961

2,991,121
MOTOR VEHICLE ROOF CONSTRUCTION
Béla Barényi, Stuttgart-Vaihingen, Germany, assignor to Daimler-Benz Aktiengesellschaft, Stuttgart-Unterturkheim, Germany
Filed Jan. 28, 1958, Ser. No. 711,639
Claims priority, application Germany Feb. 13, 1957
6 Claims. (Cl. 296—137)

The present invention relates to the roof construction of a motor vehicle, and more particularly to the cover or top of the passenger space constituted by the side body walls and the roof surface within the region in which the lateral or side walls pass over into the roof surface by means of a lateral, usually rounded-off, upper edge portion.

It is well established to be necessary that the cover or top for the passenger space be reinforced at this place.

In the motor vehicles known to date in the prior art, this reinforcement was realized by means of hollow profile members which extend along the transition places within the interior of the passenger space or by means of tubular members which extend transversely to the direction of travel.

Furthermore, the reinforcement was also realized in the prior art by double-walled roof constructions or by the appropriate flanging of the joining parts along the endangered edges and by the insertion of further connecting pieces.

However, with all of these prior art constructions, the fact had to be accepted that the space necessary within the region of the transition from the lateral or side walls to the roof in proximity of which usually the head of a passenger was disposed was considerably reduced thereby.

Furthermore, the inwardly projecting parts of the prior art constructions also endangered the safety of the passengers.

Other solutions proposed for the reinforcement of the roof construction did not prove satisfactory since, for example, reinforcing strips arranged at the roof disturbed the aesthetic line of the outer appearance of the vehicle and since additional costs are connected with the installation thereof. Annularly shaped constructions above the roof which also serve other purposes did not bring about the safety necessary for the reinforcement of the roof construction.

For purposes of increasing the rigidity of the cover or top of the passenger space of motor vehicles and for purposes of simplification of the manufacture thereof, the present invention proposes, while avoiding the aforementioned disadvantages, to reinforce the cover or top by means of a hollow body which lies essentially outside the surfaces normally delimiting the cover or top, which is annularly shaped and closed and which does not reduce at all or at the most reduces only to a silght extent the interior space for the passengers. The hollow body member in accordance with the present invention is thereby so constructed that it touches or includes the line or resulting imaginary line, as the case may be, which results from the intersection of the lateral profile edges of the body or wall portions thereof with the upper line delimiting the roof.

The cross section of the hollow body according to a further feature of the present invention may be constructed of U-shape and the leg portions thereof may be secured at the places of the lateral body and roof surfaces where these surfaces pass over into each other with a rounded-off edge portion. With such a construction, it is appropriate if the axis of inertia of the hollow body member in accordance with the present invention lies outside the imaginary line produced by an infinite number of intersections.

The reinforcing strip in accordance with the present invention, which is bent advantageously into U-shape from a sheet-metal strip, may also be emplaced or mounted at the place to be reinforced thereby in such a manner that the line of the intersection of the roof surface with the lateral walls lies along an outer edge of the U-shaped profile.

Other embodiments in which the roof is bent upwardly along the sides may be so constructed that the lower leg portion of the reinforcing strip adjoins further below the lateral wall so that the imaginary line is then disposed or lies along the upper side surface of the reinforcing strip provided, for example, with a U-shaped profile or an approximately U-shaped profile. The side and roof surfaces which terminate in the edge portions of the U-shaped profile are thereby advantageously interconnected by an intermediate or insert member connecting the ends thereof so that a reinforcing strip having a closed cross section is again formed thereby which does not use any of the space within the interior of the passenger space.

The hollow body member according to the present invention may also be formed by a tubular member which may be manufactured in a simple and inexpensive manner and which may appropriately have, for instance, an elliptical form. The elliptical tubular member is bent into the shape of a ring or annular member corresponding to the roof shape and is welded between the terminal edges of the side body walls and of the roof or is suitably secured therebetween, for example, by bonding, cementing, gluing or any other suitable manner appropriate for the purpose and adequate with the given material. This construction is so made that the point of intersection of the imaginary extended roof surface with the side walls also imagined to be extended upwardly forms a line which lies exactly or approximately at the geometric cross-sectional center point of the tubular member.

The reinforcement according to the present invention for the cover or top which also projects laterally beyond the roof surface simultaneously forms a lateral boundary or limit for the storage space available on the roof and is effective at the same time as a rain ledge. The profile member projecting upwardly beyond the normal roof contour primarily serves as a very good storage surface for long or wide objects such as, for example, cabinets or tables as well as for the accommodation of a plate forming a base surface for goods to be shipped of the most different types, especially, however, also for camping beds.

The projecting profile member is further well suited for the direct attachment thereto of hooks, eyelets or the like, for example, for securing a luggage hood, a tent or the like.

The hollow body members attached as reinforcement may also serve as water reservoir, for example, of a windshield-wiper washing installation or a camping washing installation.

Accordingly, it is an object of the present invention to provide a reinforcement for a roof construction of a motor vehicle which is simple, yet sturdy, and which does not increase disproportionately the cost of construction and manufacture of the vehicle top.

Another object of the present invention is the provision of a roof or top construction for a passenger motor vehicle which is reinforced for purposes of safety of the passengers without, however, reducing the head space for the passengers.

Still another object of the present invention is the provision of a roof construction which does not impair or mar the outer appearance of the motor vehicle.

A further object of the present invention is the provision of a roof construction for a motor vehicle which is formed of a hollow body member simultaneously serving for other useful purposes, such as water reservoir, and to which suitable fastening means may be applied.

Another essential object of the present invention is the provision of a reinforced roof construction which simplifies the manufacture thereof.

A further object of the present invention is the provision of a roof construction for motor vehicles which appropriately reinforces the joint where the body walls merge over into the roof surface and which is particularly suitable for camping cars.

Figure 2:
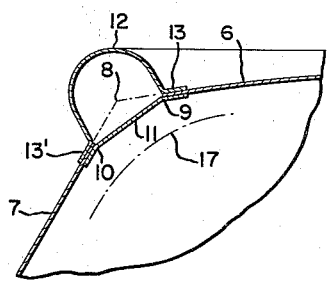
Figure 3:
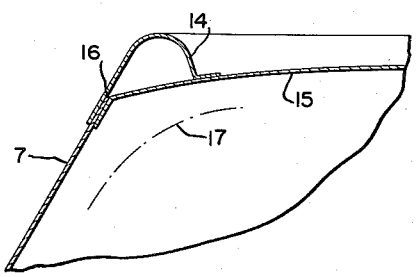
Figure 5:
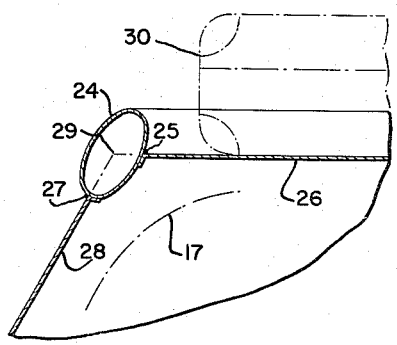
Figure 4:
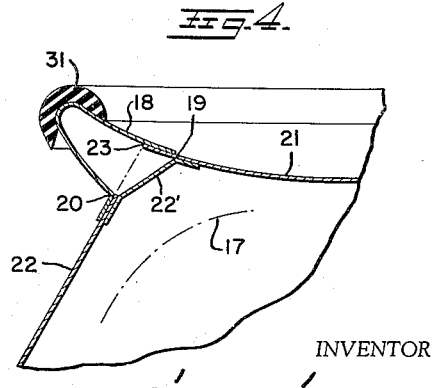

These and other objects, features and advantages of the present invention will become more obvious from the following description when taken in connection with the accompanying drawing which shows, for purposes of illustration only, several embodiments in accordance with the present invention, and wherein:

FIGURE 1 is a side view of a motor vehicle provided with a reinforcing member along the rim portion of the roof surface in accordance with the present invention, the remainder of the vehicle being illustrated only schematically, FIGURE 2 is a partial cross-sectional view through a reinforced roof construction of a second embodiment in accordance with the present invention provided with an essentially U-shaped reinforcing member, FIGURE 3 is a partial cross-sectional view through a third embodiment of a reinforced roof construction in accordance with the present invention in which the reinforcing member is arranged above the line of intersection of the roof surface with the side wall of the body, FIGURE 4 is a partial cross-sectional view through a fourth embodiment of a reinforced roof construction in accordance with the present invention in which the reinforcing member is arranged below the imaginary line of intersection, and FIGURE 5 is a partial cross-sectional view through a fifth embodiment of a reinforced roof construction in accordance with the present invention provided with a hollow tubular reinforcing member of elliptical contour.

Referring now to the drawing, wherein like reference numerals are used throughout the various views to designate like parts, and more particularly to FIGURE 1, reference numeral 1 generally designates the motor vehicle of any suitable construction and illustrated therein in side view. The motor vehicle 1 includes a passenger space which is closed in the upward direction by the cover or top formed by the side walls 2 and the roof surface 3, as well as any window panes, etc., as is well known. At the place where the lateral profile edges of the body side walls 2 as well as any other body panels, windshield frames, etc., intersect the roof surface 3, are disposed the points of intersections 4 which form in their entirety an imaginary line extending around the entire roof and laterally limiting the same. This imaginary line formed by an infinite number of points 4 determines the place where the reinforcing member is to be attached in such a manner that the hollow body member which forms the reinforcement either touches this imaginary line or includes the same.

In FIGURE 1, the reinforcing hollow body member 5 is formed of a part of a tube or pipe which is bent as seen in cross section corresponding to the lateral contour or delimitation of the roof surface, and is secured within the region of the transition of the side wall to the roof surface in such a manner that the imaginary line 4 is enclosed by the cross-section of the hollow body member 5. Openings 32 may be provided as inlets and outlets when it is desired to use the hollow body member 5 as a water reservoir.

FIGURE 2 is a cross-sectional view through an upper corner of the passenger space taken along the side walls or possibly also within the region of the front or rear window frames of a motor vehicle in accordance with the present invention. The roof surface 6 constituted by an appropriate panel and side wall 7 would intersect, if extended outwardly or upwardly respectively in a rectilinear manner, in the imaginary point 8 which forms a line around the roof. The terminal edge portions 9 and 10 of the roof surface 6 and of the side wall 7, respectively, are interconnected by an intermediate member 11 made of any suitable materials, such as of a strip of sheet metal, having appropriate flanges for connection with the side wall 7 and the roof surface 6. The reinforcing member 12 is bent essentially symmetrically into U-shape from a suitable sheet-metal strip. The outer edge portions 13 and 13' of the free leg portions of the U-shaped part are appropriately bent for purposes of providing flanged connections with the roof surface 6 and the side wall 7 so that the reinforcing member 12 may be secured to the passenger motor vehicle top by means of these flange portions 13 and 13'. The two parts 11 and 12 thereby constitute the reinforcing hollow body member which reinforces the cover or top of the motor vehicle. The imaginary line 8 formed by the points of intersection around the entire roof of the vehicle lies within the cross section of the reinforcing member 11, 12. Furthermore, a line 17 indicates the limit or outline of the head of a passenger in the motor vehicle when normally accommodated.

The hollow body member designated by reference numeral 14 and illustrated in FIGURE 3 is constructed asymmetrically in contrast to FIGURE 1 and is arranged at the roof so as to extend only upwardly. The hollow body reinforcing member 14 consists of a part which is arcuate and has an essentially U-shaped cross section, which is so secured to the roof surface 15 that the lower edge thereof coincides with the lines 16 which is formed by the intersection of the edge portions of the roof surface 15 and of the side wall 7. Again, reference numeral 17 outlines the contours of the head of a passenger.

In the embodiment of FIGURE 4, the roof surface 21 is bent upwardly along the edge portions thereof. The reinforcing hollow body member 18 conforms in the upper part thereof to the configuration of the roof surface with which it coincides and at first continues the same, only to be connected with the lower leg portion thereof after undergoing an essentially U-shaped bend with the side wall 22 of the motor vehicle body. The reinforcing member 18 is also constructed of essentially U-shape in cross section even though not symmetrically in this case. The terminal edges of the free leg portions of the reinforcing member 18 and the terminal edge portions 19 and 20 of the roof 21 and of the side wall 22 are connected with each other by an intermediate member 22' so that a hollow body member closed upon itself is again established thereby. The intermediate member 22' may be provided with appropriate flange portions for connection with the roof surfaces 21 and with the side wall 22. The imaginary line which results from the points of intersection of the extended side wall 22 with the roof surface 21 is designated in FIGURE 4 by reference numeral 23. A guard member designated by reference numeral 31 and made of any suitable material, for example, rubber, which simultaneously may serve as rain ledge may be arranged about the surface of the essentially U-shaped bent part of the reinforcing member 18.

In the embodiment of FIGURE 5, the hollow body member is formed by a tubular member 24 having an elliptical cross section. The tubular member 24 is secured, for example by welding, with the roof surface 26 and with the side wall 28 in such a manner that the major axis of the ellipse is welded approximately vertically between the terminal edge portions of the roof 26 and the terminal edge portions 27 of the side wall 28. The imaginary line 29 formed by the points of intersection is surrounded in this embodiment by the hollow body member 24.

In FIGURE 5, reference numeral 30 designates a part of a suitcase which is placed on the roof of the motor vehicle and which is prevented from falling off by the reinforcing member 24.

The schematic illustration of a part of the head of a passenger shown in FIGURES 2 through 5 and designated therein by reference numeral 17 clearly indicates that in none of the embodiments illustrated in FIGURES 2 to 4 the interior passenger space of the vehicle is reduced to any extent which might be annoying to the passenger. In the embodiment illustrated in FIGURE 5, the hollow body member 24 slightly projects into the passenger space, which, however, with due regard to the known prior art constructions, is rather insignificant, and without any material disadvantage.

By reason of the fact that the reinforcement is arranged essentially on the outside, neither any space within the interior of the vehicle is thereby used up nor any projecting corners are created thereby within the interior of the vehicle which with the known prior art constructions oftentimes gave rise to injuries of the passengers, for example, during collisions, because the head of the passenger could readily be thrown against the prior art reinforcing member and could be seriously hurt on the parts which in the prior art devices projected relatively far into the interior of the passenger space of the vehicle. Moreover, the present invention enables the possibility of greater freedom in the configuration as well as dimensioning of the roof.

While I have shown and described several embodiments in accordance with the present invention, it is understood that the same is not limited thereto but is susceptible of many changes and modifications within the spirit of the present invention, and I intend to cover all such changes and modifications as encompassed by the appended claims.

I claim:
1. In a reinforced top construction for the passenger space of a motor vehicle formed by the vehicle body walls and the panel constituting the vehicle roof surface, the improvement comprising a hollow reinforcing body member of substantially uniform cross-section extending about the entire periphery of said roof panel within the region defined by the intersection of said body walls and said roof panel, said body member being located at least substantially outside of said passenger space and essentially at the line of intersection of said body wall and said roof panel and extending outwardly and upwardly from said intersection and normally delimiting said top to thereby form a common reinforcing ring member extending about the periphery of the vehicle roof.

2. A reinforced top construction for the passenger space of a motor vehicle as defined in claim 1, wherein said body walls and said roof panel intersect in a solid joint, and said body member comprises an independent, U-shaped member extending outwardly and upwardly from said joint and having a first leg portion thereof secured to said body walls and a second leg portion thereof secured to the roof panel.

3. A reinforced top construction for the passenger space of a motor vehicle as defined in claim 1, wherein said body walls and said roof panel intersect in an imaginary line extending around the periphery of said vehicle roof, and wherein said body member comprises an independent, U-shaped member having a first leg portion secured to the end portion of said body walls and a second leg portion secured to the end portion of said roof panel, and a second member attached to the edge portions of said body walls and said roof panel and closing the open end of said U-shaped member.

4. A reinforced top construction for the passenger space of a motor vehicle according to claim 1, wherein said body walls and said roof panel meet in an imaginary line extending around the periphery of said vehicle roof, and said body member comprises an angular, substantially elliptical member closing the area between the end portions of said body walls and said roof panel, and wherein said imaginary line is located approximately in the geometric center of said elliptical member.

5. A reinforced top construction for the passenger space of a motor vehicle as defined in claim 1, wherein said hollow body member is an essentially U-shaped member having two leg portions, said leg portions being secured at the edge portions of the body walls and roof panel defining said intersection.

6. A reinforced top construction for the passenger space of a motor vehicle as defined in claim 1, wherein said body walls and said roof panel intersect in an imaginary line extending around the periphery of said vehicle roof, and wherein said hollow body member includes in the hollow interior thereof said imaginary line extending about said top.

References Cited in the file of this patent

UNITED STATES PATENTS

| | | |
|---|---|---|
| 1,090,985 | Hopkins | Mar. 24, 1914 |
| 1,808,561 | Ledwinka | June 2, 1931 |
| 2,369,579 | Kobligk | Feb. 13, 1945 |